(12) United States Patent
Homer et al.

(10) Patent No.: US 7,436,655 B2
(45) Date of Patent: Oct. 14, 2008

(54) PERSONAL COMPUTING DEVICE WITH REMOVABLE ACCESSORY MODULE

(75) Inventors: Steven S. Homer, Tomball, TX (US); Paul J. Doczy, Cypress, TX (US); Earl Moore, Cypress, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 721 days.

(21) Appl. No.: 10/765,806

(22) Filed: Jan. 27, 2004

(65) Prior Publication Data

US 2005/0162821 A1 Jul. 28, 2005

(51) Int. Cl.
*G06F 1/16* (2006.01)

(52) U.S. Cl. .................. 361/683; 361/681; 248/917; 248/919

(58) Field of Classification Search ......... 361/680–683, 361/728–735; 16/233–236, 297, 309, 362, 16/364; 248/917–924; 312/223.1, 223.2
See application file for complete search history.

(56) References Cited

U.S. PATENT DOCUMENTS

| | | | | |
|---|---|---|---|---|
| 5,229,920 A | * | 7/1993 | Spaniol et al. | 361/680 |
| 6,016,171 A | * | 1/2000 | Tsao | 348/836 |
| 6,384,811 B1 | * | 5/2002 | Kung et al. | 345/168 |
| 6,532,147 B1 | * | 3/2003 | Christ, Jr. | 361/683 |
| 6,556,435 B1 | * | 4/2003 | Helot et al. | 361/686 |
| 6,700,773 B1 | * | 3/2004 | Adriaansen et al. | 361/680 |
| 6,826,043 B2 | * | 11/2004 | Chang | 361/683 |

* cited by examiner

*Primary Examiner*—Jayprakash N Gandhi
*Assistant Examiner*—Anthony Q Edwards

(57) ABSTRACT

A computing device comprises a base, a lid, and a hinge structure coupling the base and the lid. The hinge structure has a variable height operable to enable the lid to close over at least one removable center module disposed on and coupled to the base.

22 Claims, 3 Drawing Sheets

PERSONAL COMPUTING DEVICE WITH REMOVABLE ACCESSORY MODULE

TECHNICAL FIELD

The present invention relates generally to the field of personal computing devices such as personal computers (PCs), laptop computers, notebook computers, tablet PCs, personal digital assistants, calculators, and in more particular to a personal computing device with a removable accessory module.

BACKGROUND

In the pursuit of mobility and portability, personal computers have slimmed down, shed weight and have become easier for users to carry and use. These computers, such as notebook and laptop computers, include one or more slots disposed in its case to accommodate accessories such as a disc drive, battery, wireless communication or network cards, etc. Although this design enables the computer maker and user to configure the computers' capabilities according to their preferences, the dimensions of the computer itself does not change with the addition or deletion of accessories as the slots are built into the housing. Further, once the computers have been configured with particular peripheral devices residing in the slots, the user generally does not alter or remove these devices from the computer.

Other personal computing devices such as handheld computers and personal digital assistants (PDAs) provide alternate means of receiving user input other than handwriting recognition. Because some users have difficulty mastering the peculiar handwriting stroke requirements of the handwriting recognition software used in these PDAs, a separate keyboard may be attached to the PDA for text input. These keyboards may be attached to the PDA via a cable or a cradle that holds the PDA. These handheld devices may further provide extension slots or connectors that may receive peripheral devices and accessories. Although the addition of these peripheral devices augments the capabilities of the PDA, they increase the bulk and weight of the PDA.

SUMMARY OF THE INVENTION

In accordance with an embodiment of the present invention, a computing device comprises a base, a lid, and a hinge structure coupling the base and the lid. The hinge structure has a variable height operable to enable the lid to close over at least one removable center module disposed on and coupled to the base. The hinge structure is further operable to enable the lid to close over the base with the at least one removable center module removed from the base.

In accordance with another embodiment of the invention, a computing device comprises a base housing a plurality of electrical components, at least one removable center module disposed on and electrically connectable to the plurality of electrical components in the base, a lid, and a hinge structure coupling the base and the lid. The hinge structure has a variable height operable to enable the lid to close over the at least one removable center module disposed on and coupled to the base. The hinge structure is further operable to enable the lid to close over, the base with the at least one removable center module removed from the base.

In accordance with yet another embodiment of the present invention, a device comprises first and second portions, and a hinge structure coupling the first and second portions. The hinge structure has a variable height operable to enable the first portion to close over at least one removable center module disposed on and coupled to the second portion. The hinge structure is further operable to enable the first portion to close over the second portion with the at least one removable center module removed from the second portion.

BRIEF DESCRIPTION OF THE DRAWINGS

For a more complete understanding of the present invention, the objects and advantages thereof, reference is now made to the following descriptions taken in connection with the accompanying drawings in which.

DETAILED DESCRIPTION OF THE DRAWINGS

The preferred embodiment of the present invention and its advantages are best understood by referring to FIGS. 1 through 4 of the drawings, like numerals being used for like and corresponding parts of the various drawings.

Figure 1:
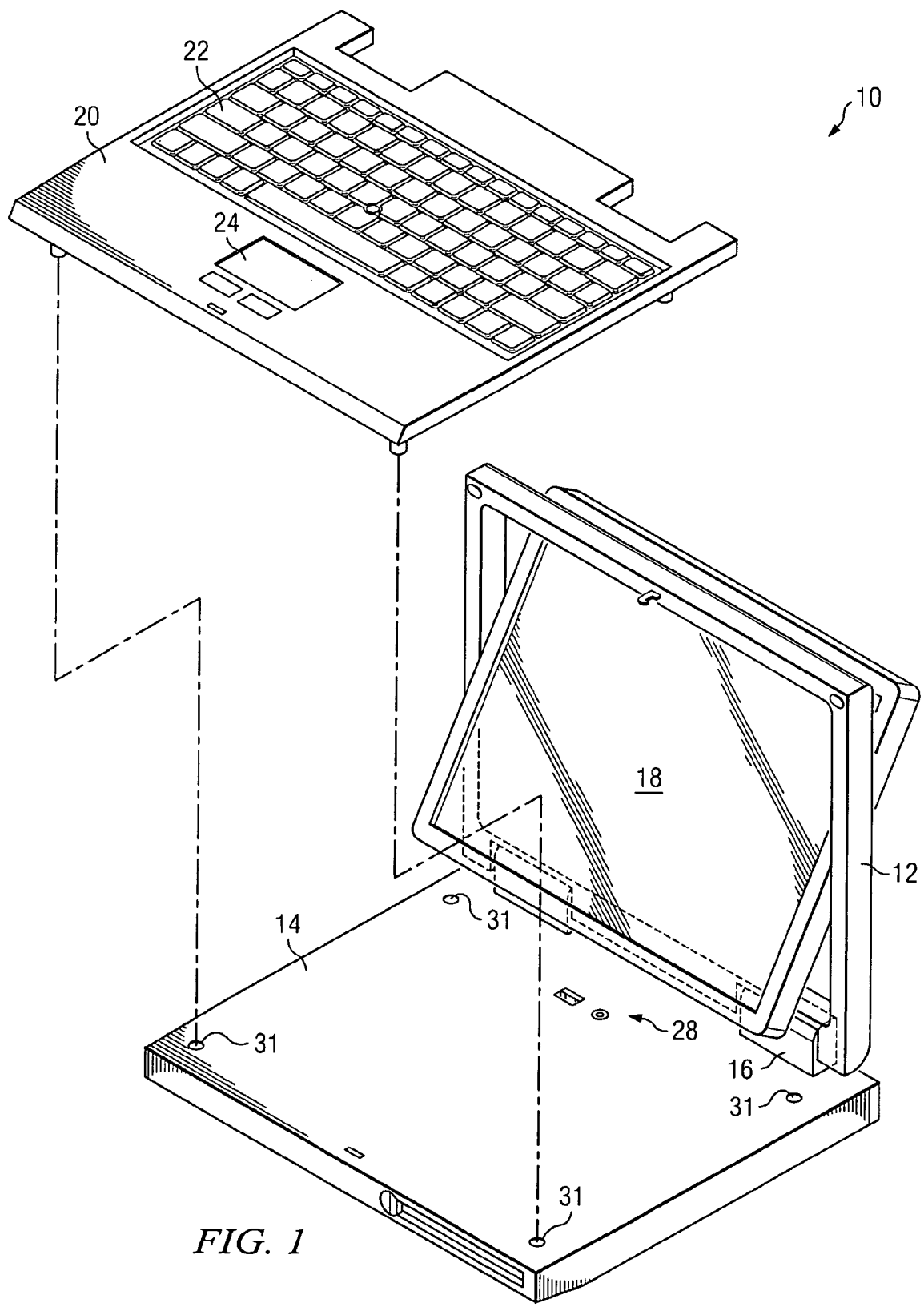
FIG. 1 is a perspective view of an embodiment of a personal computing device with a removable center peripheral module according to the present invention.

FIG. 1 shows a perspective view of a tablet personal computer (PC) 10 according to an embodiment of the present invention. Tablet PC 10 comprises a lid housing 12 pivotally coupled to a base housing 14 using a unique hinge structure 16. Lid housing 12 is operable to accommodate a display screen 18. Base housing 14 is operable to accommodate a removable center accessory module 20, shown housing a keyboard 22 and a touchpad 24, which is interchangeable with other removable accessory or peripheral modules such as a battery module, optical disc drive module, hard drive module, wireless communication module, global positioning system module, image capture module, and other forms of user input/output or peripheral device modules now known or later developed. The addition of these center removable modules in effect increases the thickness of base housing 14.

Hinge structure 16 is operable to accommodate any varying thickness of the interchangeable accessory modules and enable the lid to close over the base. Hinge structure 16 is also operable to accommodate even the absence of an interchangeable accessory module 20, as seen in FIGS. 2A through 2D. It may be seen that hinge structure 16 may be elevated to accommodate an accessory module 20 or be lowered when the configuration of the PC does not include an accessory module 20. Tablet PC 10, with accessory module 20 such as the keyboard module removed, has a more slender profile with less weight that makes it even easier to carry and handle. Hinge structure 16 rotatively couples lid housing 12 to base housing 14 and enables lid housing 12 to open, for example, from zero degrees (lid housing closed over the base housing) to about 180 degrees from base housing 14. Hinge structure 16 is operable to accommodate one or more electrical cables or wiring passing from base housing 14 to lid housing 12.

Removable accessory module 20 comprises a housing that accommodates electronics circuits and other components of an accessory to be used with PC 10. Accessory module 20 comprises one or more connectors 26 operable to electrically couple to connectors 28 disposed in base housing 14. Connectors 26 and 28 may support one or more universal serial bus (USB) ports, serial ports (e.g. RS-232C, EIA-232, RS-422, RS-423), parallel ports (e.g. Small Computer System Interface (SCSI), Enhanced Parallel Port (EPP), Extended Capabilities Port (ECP)), and/or electrical power connections. Connectors 26 and 28 enables the transmission of electrical signals between accessory module 20 and the electronic components in base housing 14, and indirectly between accessory module 20 and display screen 18. Connectors 26 and 28 may be positioned on any surfaces of accessory module 20 and base housing 14, respectively, that interface with one another. Accessory module 20 may further comprise one or more male alignment elements 30 operable to engage corresponding female alignment elements 31 disposed in base housing 14. Alternatively, electrical connectors 26 and 28 may function as alignment elements.

Figure 3:
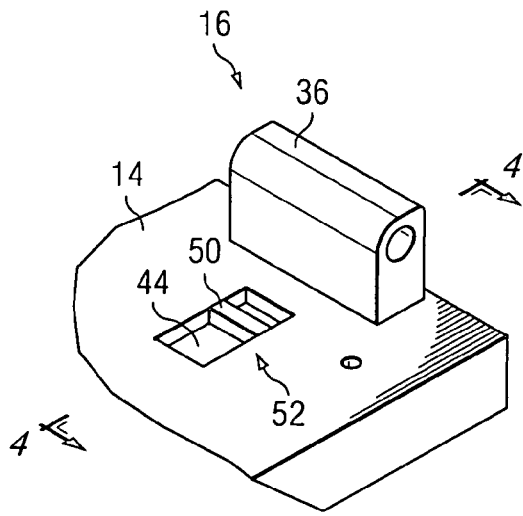
FIG. 3 is a perspective view of a hinge structure of a personal computing device according to an embodiment of the present invention.
Figure 4:
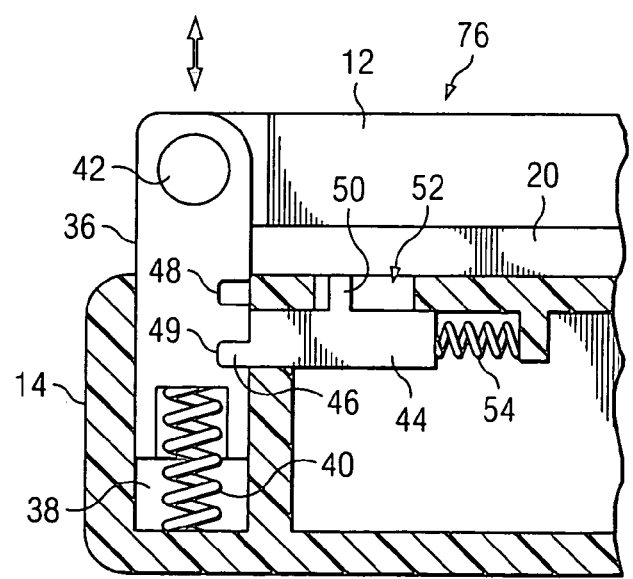
FIG. 4 is a cross-sectional view of the hinge structure shown in FIG. 3 and taken along line 4-4 thereof according to an embodiment of the present invention.

Referring to FIG. 3, more details of hinge structure 16 are shown with a cross-sectional view along lines 4-4 shown in FIG. 4. FIG. 3 is shown with lid housing 12 removed for better clarity. Referring to both FIGS. 3 and 4, hinge structure 16 comprises a clutch member 36 generally residing in a cavity 38 defined within base housing 14. Clutch member 36 is biased generally outwardly from cavity 38 by a biasing element 40 at one end thereof. The second end of clutch member 36 protrudes from cavity 38 and is rotatively coupled to lid housing 12 by a pin 42, for example. Clutch member 36 is operable to vary its height protruding from cavity 38 and therefore the height of the pivot point from which lid housing 12 rotates.

In one embodiment of the present invention, hinge structure 16 further comprises a lock button 44 having a locking nib 46 operable to engage one or more notches 48 and 49 formed in clutch member 36. By engaging locking nib 46 in one of the notches in clutch member 36, the height of clutch member 36 may be maintained. For example, when lock button 44 is engaged with notch 49, clutch member 36 may be at its maximum height that can accommodate an accessory module 20 disposed between lid housing 12 and base housing 14. When lock button 44 is engaged with notch 48, clutch member 36 may be at its minimum height that enables PC 10 to have a trim profile with no accessory module attached. Lock button 44 further comprises a finger latch 50 accessible to a user via an opening 52 formed in base housing 14. Finger latch 50 may be used by the user to engage or disengage lock button 44 with notches 48 and 49 in clutch member 36. Lock button 44 may be biased toward clutch member 36 by a second biasing member 54 so that when engaged, lock button 44 does not easily slip out of the notches in clutch member 36. Constructed in this manner, lock button 44 is operable to securely latch clutch member 36 to maintain the height of hinge structure 16 and to unlock clutch member 36 to vary the height of hinge structure 16.

The number of notches 48 and 49 in clutch member 36 and positions thereof are dependent on the thickness of the accessory modules to be accommodated by PC 10. For example, PC 10 may accommodate a number of accessory modules with two different thicknesses. Therefore, clutch member 36 may comprise three notches, for example, two of which positioned to accommodate the two different thicknesses of the accessory modules, and one positioned for the lightweight configuration without an accessory module attached.

Figure 2A:
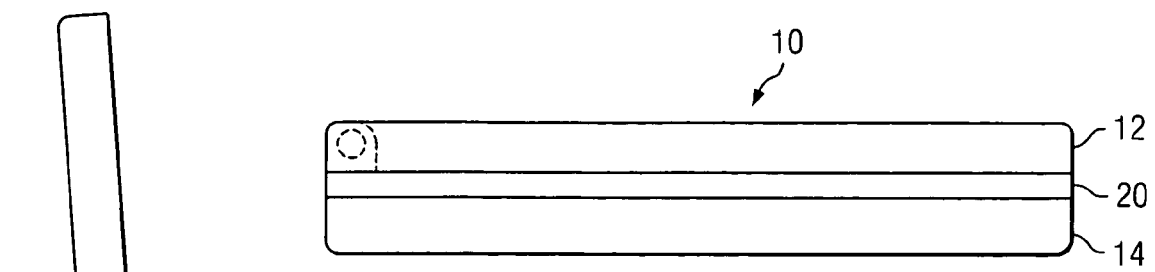
FIGS. 2A-2E are side views of embodiments of a personal computing device according to the present invention.
Figure 2B:
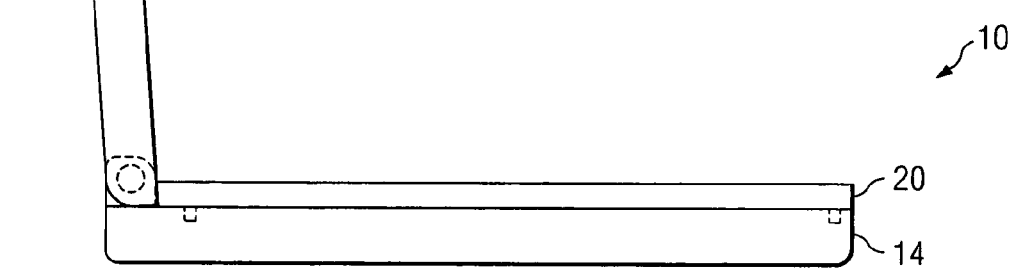
Figure 2C:
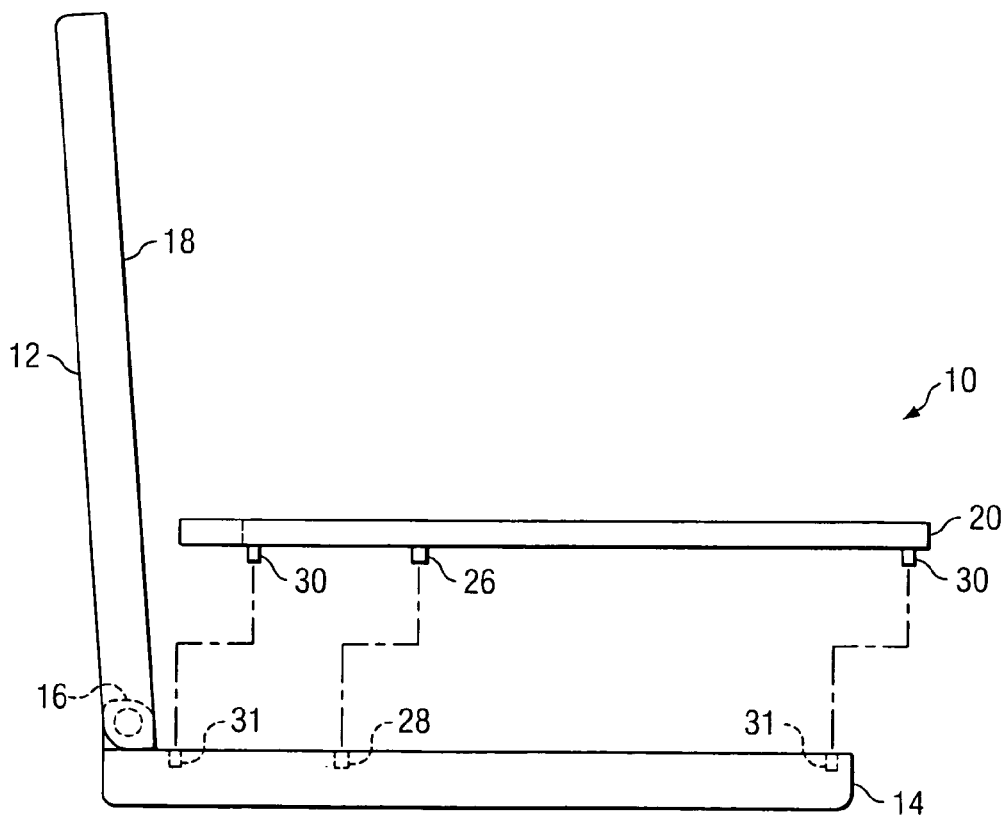
Figure 2D:
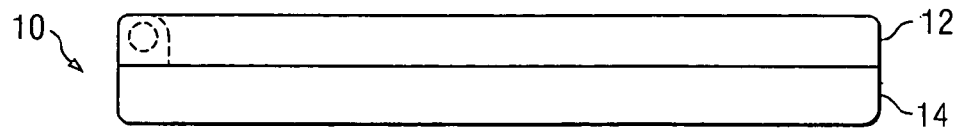
Figure 2E:
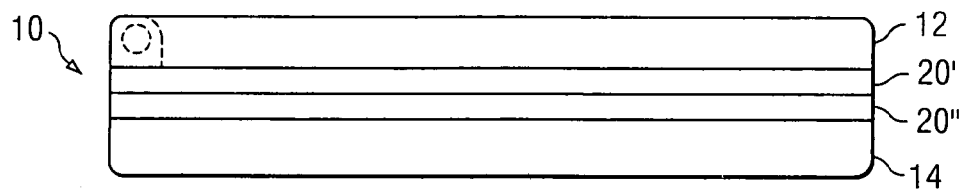

Because the height of hinge structure 16 can be varied, lid housing 12 and base housing 14 can accommodate a center accessory module 20 of varying thickness. The profile of lid housing 12 and base housing 14 can also be substantially slimmed down with the center accessory module removed. For example, when PC 10 is used as a tablet PC where the user input is received via the display screen, the keyboard module is not needed for user input and can be removed. On the other hand in other embodiments the flexibility of hinge structure 16 also enables the inclusion of multiple removable center modules 20' and 20" between lid housing 12 and base housing 14, as shown in FIG. 2E. The center modules may comprise one or more connectors for interconnection between the center modules for passing electrical signals and power, for example. In this embodiment, clutch member 36 comprises notches, the number and position(s) thereof being designed to accommodate the multiple center modules.

Although the description herein is generally directed to a tablet PC, embodiments of the present invention are equally applicable to other personal computing devices where a slim profile and light weight are desired characteristics. For example, a PDA may employ a removable thumb-operated keyboard module and/or a removable touch-sensitive screen module according to the embodiments of the present invention to enable its user to select a preferred input interface without adding to its bulk or weight.

Embodiments of the present invention are applicable to a device having two portions coupled by a hinge structure. The unique design of the hinge structure accommodates variable thickness of the two portions caused by adding and removing one or more removable center modules stacked onto one of the two portions.

What is claimed is:

1. A computing device, comprising:
a base;
at least one removable center module disposed on and coupled to the base;
a lid; and
a hinge structure having a clutch member coupling the base and the lid, the hinge structure comprises at least one biasing member operable to exert a force on the clutch member vertically outwardly from the base, the clutch member having a variable height operable to enable the lid to close over the at least one removable center module.

2. The computing device, as set forth in claim 1, wherein the hinge structure is further operable to enable the lid to close over the base with the at least one removable center module removed from the base.

3. The computing device, as set forth in claim 1, wherein the clutch member is operable to protrude above and beyond the base at varying heights.

4. The computing device, as set forth in claim 3, further comprising at least one lock button having a locking nib operable to releaseably engage at least one notch defined in the clutch member.

5. The computing device, as set forth in claim 4, wherein an opening is defined in the base to enable a user to manipulate the at least one lock button toward and away from the clutch member.

6. The computing device, as set forth in claim 1, the clutch member operable to receive a lock button operable to fasten the clutch member in one of a number of heights protruding above and beyond the base.

7. The computing device, as set forth in claim 1, wherein the hinge structure further comprises at least one second biasing member operable to exert a force on the at least one lock button toward the clutch member.

8. The computing device, as set forth in claim 1, wherein the hinge structure rotatively couples the lid to the base.

9. The computing device, as set forth in claim 1, further comprising a plurality of electrical components housed in the base, and the at least one removable center module is electrically connectable to the plurality of electrical components.

10. The computing device, as set forth in claim 1, wherein the lid comprises a display screen.

11. The computing device, as set forth in claim 1, wherein the at least one removable center module comprises:
   first center module operable to be disposed on and releaseably coupled to the base;
   second center module operable to be disposed on and releasable coupled to the first center module; and
   the hinge structure enabling the lid to close over the second center module.

12. A device, comprising:
   first and second portions;
   at lease one removable center module disposed on and coupled to the second portion; and
   a hinge structure having a clutch member coupling the first and second portions, the hinge structure comprising at least one biasing member operable to exert a force on the clutch member vertically outwardly from the second portion, the clutch member having a variable height operable to enable the first portion to close over at least one removable center module.

13. The device, as set forth in claim 12, wherein the hinge structure comprises at least one lock button having a locking nib operable to engage at least one notch defined in the clutch member for releaseably locking the clutch member disposed vertically in the second portion.

14. The device, as set forth in claim 13, wherein the hinge structure further comprises at least one second biasing member operable to exert a force on the at least one lock button toward the clutch member.

15. The device, as set forth in claim 13, wherein an opening is defined in the second portion to enable a user to manipulate the at least one lock button toward and away from the clutch member.

16. A computing device, comprising:
   a base adapted to receive a plurality of different size removable center modules;
   a hinge structure coupling a lid to the base, the hinge structure adapted to accommodate the different sizes of removable center modules and enable closure of the lid relative to the base; and
   at least one biasing member operable to exert a force on a clutch member of the hinge structure vertically outwardly from the base.

17. The device, as set forth in claim 16, wherein the hinge structure comprises a clutch member adapted to protrude above and beyond the base at varying heights.

18. The device, as set forth in claim 17, further comprising at least one lock button having a locking nib operable to releaseably engage at least one notch defined in the clutch member.

19. The device, as set forth in claim 16, wherein the hinge structure comprises a clutch member operable to receive a lock button to fasten the clutch member in one of a number of heights protruding above and beyond the base.

20. The device, as set forth in claim 16, wherein the hinge structure rotatively couples the lid to the base.

21. A device, comprising:
   first and second portions;
   at lease one removable center module disposed on and coupled to the second portion; and
   a hinge structure having a clutch member coupling the first and second portions, the clutch member disposed in the second portion and having a variable height operable to enable the first portion to close over at least one removable center module.

22. The device, as set forth in claim 21, wherein the clutch member is operable to receive a lock button operable to fasten the clutch member in one of a plurality of different heights protruding above and beyond the second portion.

* * * * *

UNITED STATES PATENT AND TRADEMARK OFFICE
CERTIFICATE OF CORRECTION

PATENT NO. : 7,436,655 B2
APPLICATION NO. : 10/765806
DATED : October 14, 2008
INVENTOR(S) : Steven S. Homer et al.

Page 1 of 1

It is certified that error appears in the above-identified patent and that said Letters Patent is hereby corrected as shown below:

In column 5, line 12, in Claim 11, delete "releasable" and insert -- releaseably --, therefor.

Signed and Sealed this

Third Day of March, 2009

JOHN DOLL
*Acting Director of the United States Patent and Trademark Office*